United States Patent
Ishida et al.

(10) Patent No.: US 10,377,497 B2
(45) Date of Patent: Aug. 13, 2019

(54) ANTI-ICING SYSTEM AND AIRCRAFT

(71) Applicant: MITSUBISHI AIRCRAFT CORPORATION, Aichi (JP)

(72) Inventors: Toshiyuki Ishida, Tokyo (JP); Gento Ichikawa, Tokyo (JP); Yoichi Uefuji, Tokyo (JP); Masatoshi Morishita, Tokyo (JP); Kazuhiro Kawai, Tokyo (JP); Satoshi Watanabe, Tokyo (JP); Go Fujita, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 422 days.

(21) Appl. No.: 15/411,431

(22) Filed: Jan. 20, 2017

(65) Prior Publication Data

US 2017/0217593 A1    Aug. 3, 2017

(30) Foreign Application Priority Data

Feb. 1, 2016 (JP) .................................. 2016-017374

(51) Int. Cl.
   *B64D 15/04* (2006.01)
(52) U.S. Cl.
   CPC .................................... *B64D 15/04* (2013.01)
(58) Field of Classification Search
   CPC .............................. B64D 15/02; B64D 15/04
   See application file for complete search history.

(56) References Cited

U.S. PATENT DOCUMENTS

| | | | | |
|---|---|---|---|---|
| 3,917,193 A | * | 11/1975 | Runnels, Jr. ............... | B64C 9/24 244/134 B |
| 5,011,098 A | * | 4/1991 | McLaren ................ | B64D 15/04 244/134 B |
| 5,841,079 A | * | 11/1998 | Parente ................... | B64C 23/00 181/214 |
| 6,003,814 A | * | 12/1999 | Pike ........................ | B64D 15/04 239/587.1 |
| 6,119,978 A | * | 9/2000 | Kobayashi ............ | B21D 26/055 244/134 R |
| 6,467,730 B2 | * | 10/2002 | Laugt ...................... | B64D 15/04 244/123.14 |
| 6,702,233 B1 | * | 3/2004 | DuPont ................... | B64D 15/04 244/134 B |

(Continued)

FOREIGN PATENT DOCUMENTS

JP    2009-523637 A    6/2009
JP    2011183922 A     9/2011

*Primary Examiner* — Justin M Benedik
(74) *Attorney, Agent, or Firm* — Pearne & Gordon LLP

(57) ABSTRACT

There is provided an anti-icing system that has a simple structure and makes it possible to exert anti-icing performance by dealing with displacement of a stagnation point without increasing air resistance. The anti-icing system according to the present invention blows heated gas to an inner surface of a wing of an aircraft, and includes: a piccolo tube that includes a flow path through which the heated gas flows in a longitudinal direction from a rear end to a front end, and a plurality of ejection holes provided along the longitudinal direction to make the flow path communicate with an outside; and a supply source that supplies the heated gas toward the piccolo tube. The piccolo tube is held to cause positions of the respective ejection holes to be fixed in a gravity direction.

20 Claims, 10 Drawing Sheets

(56) References Cited

U.S. PATENT DOCUMENTS

| | | | | |
|---|---|---|---|---|
| 7,900,872 B2* | 3/2011 | Sternberger | ........... | B64D 33/02 |
| | | | | 244/134 C |
| 8,967,543 B2* | 3/2015 | Saito | ....................... | F01D 25/02 |
| | | | | 239/599 |
| 2009/0090814 A1* | 4/2009 | Barbara | .................. | B64C 21/10 |
| | | | | 244/134 B |
| 2010/0176243 A1* | 7/2010 | Nieman | ................ | B64D 15/04 |
| | | | | 244/134 B |
| 2011/0108662 A1* | 5/2011 | Diochon | ............... | B64D 15/04 |
| | | | | 244/54 |
| 2012/0187254 A1* | 7/2012 | Wollaston | ................ | B64C 9/22 |
| | | | | 244/214 |
| 2017/0166313 A1* | 6/2017 | Saeed | .................... | B64D 15/04 |

\* cited by examiner

FIG. 2A
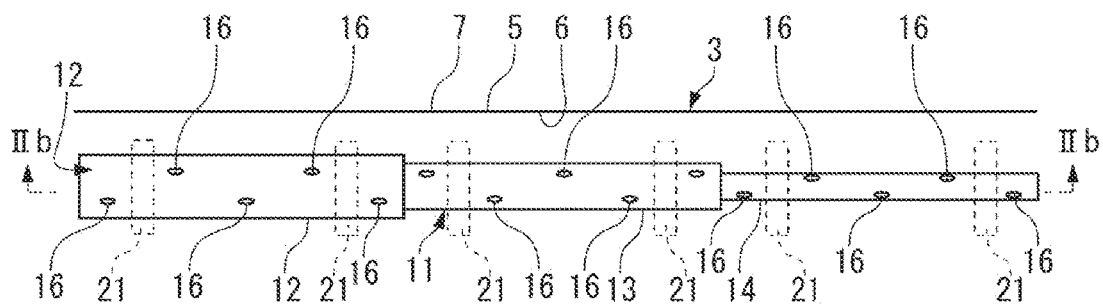
FIG. 2B
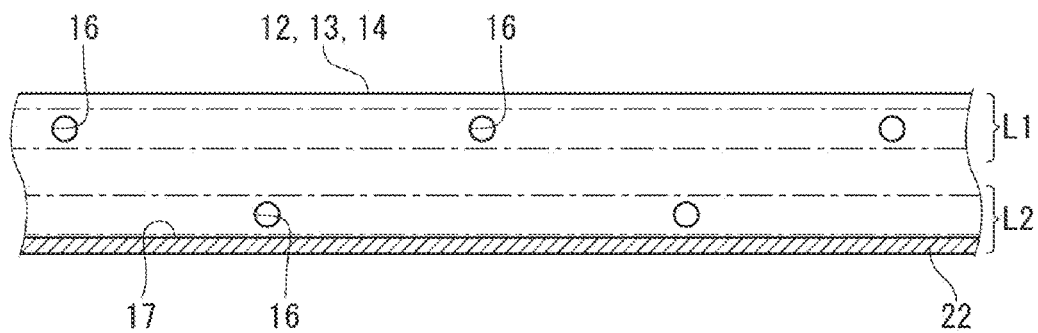
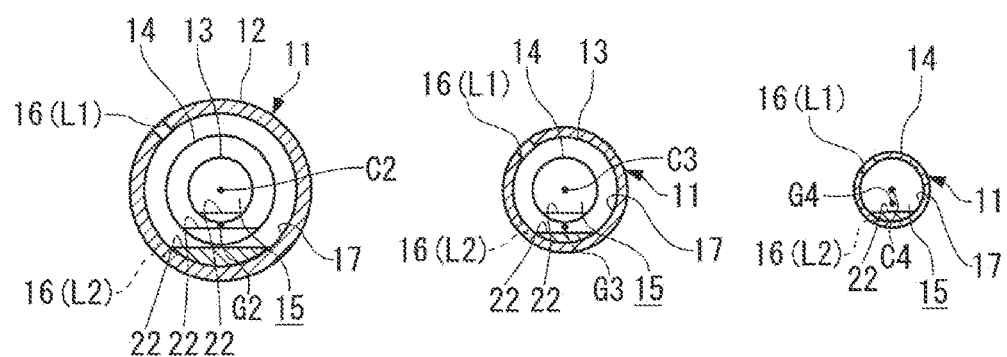
FIG. 2C    FIG. 2D    FIG. 2E

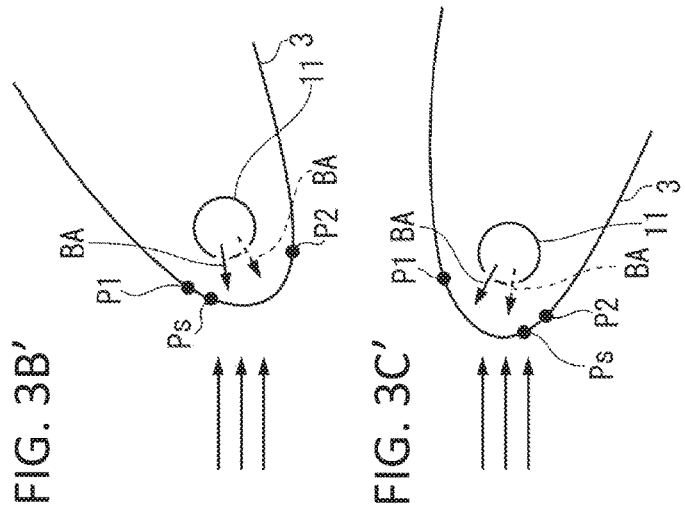
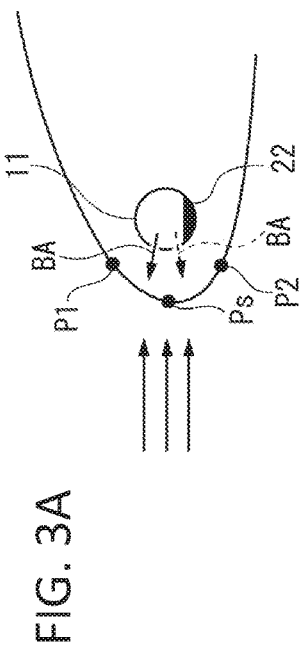
FIG. 3A
FIG. 3B
FIG. 3C

ANTI-ICING SYSTEM AND AIRCRAFT

BACKGROUND OF THE INVENTION

Field of the Invention

The present invention relates to an anti-icing system that prevents icing on a leading edge of an aircraft, and to an aircraft including the anti-icing system.

Description of the Related Art

During flight of an aircraft, icing occurs on an outer surface of a leading edge in a traveling direction of the aircraft, such as a main wing, a tail wing, and an air intake, due to collision of supercooled droplets in the air. The icing phenomenon variously influences flight of the aircraft. Therefore, an anti-icing system that prevents icing by various heating means are provided at positions that may be particularly affected by the icing phenomenon.

In an aircraft including a turbine engine, as one of the anti-icing system, bleed air that is high-temperature high-pressure air extracted from an engine compressor has been widely used as a heating source. In such an anti-icing system, the bleed air is guided through a pipe and is blown to the inner surface of the leading edge, thereby performing heating. A member called piccolo tube that has, in the longitudinal direction, a plurality of ejection holes through which the bleed air is ejected is used as the pipe. For example, when being provided in the main wing, the piccolo tube is disposed near the leading edge along a wing length direction from an end connected to a fuselage toward a front end. As illustrated in FIG. 10A, the method makes it possible to provide high heat transfer coefficient at a blown point of the bleed air BA. This makes it possible to reduce an air supply amount and to suppress deterioration of fuel consumption, as compared with other methods.

In FIG. 10B, a solid line DD indicates distribution of the heat transfer coefficient of the bleed air, and a dashed line HD indicates distribution of collision of droplets. The drawing shows that the blown point at which the heat transfer coefficient of the bleed air shows a peak and an outside airflow stagnation point (hereinafter, simply referred to as a stagnation point) Ps at which the collision amount of the droplets shows a peak are coincident with each other.

As illustrated in FIG. 10B, the heat transfer coefficient is drastically decreased at a position away from the blown point at which the heat transfer coefficient shows a peak. Therefore, temperature unevenness easily occurs at the blown point and positions (P1 and P2) away from the blown point. If the positions of the respective ejection holes of the piccolo tube are not appropriate, disadvantageously, heating may become insufficient or damage of the leading edge structure caused by overheating may be accelerated. Therefore, focusing on particularly stringent icing flight condition, a method of orienting ejection holes to concentrate a heating amount to a stagnation point where a collision amount of the droplets shows a peak under the condition is typically used. When the flight condition, in particular, an angle of attack of the aircraft is varied and the position of the stagnation point is accordingly moved, however, the blown point, namely, a point to which the heating amount is concentrated is not coincident with the position at which the collision amount of the droplets shows a peak as illustrated in FIG. 10C, which deteriorates efficiency of heating. This may cause increase of the air amount necessary for anti-icing or may accelerate damage of the leading edge structure by overheating.

Therefore, Japanese Patent Laid-Open No. 2011-183922 suggests a method of configuring the inner surface side of the leading edge structure of the main wing as the double structure and averaging heat transfer coefficients. In addition, National Publication of International Patent Application No. 2009-523637 suggests means that promotes cooling by making a transition from a flow on an outer surface of the leading edge structure to turbulent flow, thereby preventing local overheating.

The suggestion by Japanese Patent Laid-Open No. 2011-183922, however, uses the double structure that is complicated. In addition, since the weight is increased and heat loss to the parts other than the part to be heated is large, it is necessary to increase the amount of extracted air, which may result in deterioration of fuel consumption.

Moreover, the suggestion by National Publication of International Patent Application No. 2009-523637 uses the structure that makes transition to the turbulent flow. The structure may increase, for example, air resistance of a main wing and accordingly cause deterioration of fuel consumption. In addition, since the cooling of the leading edge is promoted, the necessary amount of the heated gas may be increased.

Therefore, an object of the present invention is to provide an anti-icing system that has a simple configuration and makes it possible to exert anti-icing performance by dealing with displacement of a stagnation point without increasing air resistance.

SUMMARY OF THE INVENTION

An anti-icing system according to the present invention blows heated gas to an inner surface of a wing of an aircraft, the anti-icing system includes: a piccolo tube that includes a flow path through which the heated gas flows in a longitudinal direction from a rear end to a front end, and a plurality of ejection holes provided along the longitudinal direction to make the flow path communicate with an outside; and a supply source that supplies the heated gas toward the piccolo tube. The piccolo tube is held to cause positions of the respective ejection holes to be fixed in a gravity direction.

The piccolo tube according to the present invention may preferably have an eccentric structure in which a centroid is deviated downward from a center in a vertical direction.

The eccentric structure of the piccolo tube according to the present invention may be preferably configured by making a partial region in a circumferential direction on a cross-sectional surface larger in mass than other regions.

The piccolo tube according to the present invention may preferably include a weight on one or both of an inner peripheral surface facing the flow path and an outer peripheral surface, to cause the partial region in the circumferential direction to be larger in mass than the other regions.

The eccentric structure of the piccolo tube according to the present invention may be preferably configured by making a partial region in a circumferential direction on a cross-sectional surface larger in a size in a radial direction than other regions.

In the piccolo tube according to the present invention, the plurality of ejection holes may be straightly arranged in a first ejection hole line and a second ejection hole line, the first ejection hole line may be preferably disposed on a relatively upper side, and the second ejection hole line may be preferably disposed on a lower side of the first ejection hole line.

In the piccolo tube according to the present invention, the plurality of ejection holes of the first ejection hole line and the second ejection hole line may be preferably alternately arranged in the longitudinal direction.

An anti-icing system according to the present invention that blows heated gas to an inner surface of a wing of an aircraft, includes: a piccolo tube that includes a flow path through which the heated gas flows in a longitudinal direction from a rear end to a front end, and a plurality of ejection holes provided along the longitudinal direction to make the flow path communicate with an outside; and a supply source that supplies the heated gas toward the piccolo tube. The plurality of ejection holes of the piccolo tube are straightly arranged in a first ejection hole line and a second ejection hole line, the first ejection hole line is disposed on a relatively upper side, and the second ejection hole line is disposed on a lower side of the first ejection hole line. The piccolo tube includes a damper that adjusts a flow amount Q1 of the heated gas ejected from the first ejection hole line, and a flow amount Q2 of the heated gas ejected from the second ejection hole line. The damper increases and decreases the flow amount Q2 inversely to increase and decrease of the flow amount Q1.

In the piccolo tube according to the present invention, the flow path of the piccolo tube may be preferably equally partitioned into an upper flow path corresponding to the first ejection hole line and a lower flow path corresponding to the second ejection hole line, and the damper according to the present invention may be preferably a first damper that adjusts an amount of the heated gas flowing into each of the upper flow path and the lower flow path.

The damper according to the present invention may be preferably a second damper that is provided inside the flow path and blocks the plurality of ejection holes configuring the first ejection hole line and the plurality of ejection holes configuring the second ejection hole line.

An aircraft according to the present invention includes the anti-icing system described above.

According to the present invention, it is possible to efficiently eject the bleed air from the ejection holes toward the stagnation point of the outside airflow formed on the wing, by dealing with displacement of the stagnation point.

BRIEF DESCRIPTION OF THE DRAWINGS

FIG. 1A is a plan view of the anti-icing system including a main wing of an aircraft, and FIG. 1B is a cross-sectional diagram of the main wing;

FIGS. 2A to 2E are diagrams each illustrating a piccolo tube of FIGS. 1A and 1B, where FIG. 2A is a plan view, FIG. 2B is a cross-sectional diagram as viewed from an arrow IIb-IIb of FIG. 2A, and FIGS. 2C to 2E are cross-sectional diagrams;

FIG. 3A is a diagram illustrating a state in which an aircraft is flying horizontally, FIG. 3B is a diagram illustrating a state in which a stagnation point is positioned at an upper limit position, FIG. 3C is a diagram illustrating a state in which the stagnation point is positioned at a lower limit position, and FIGS. 3B' and 3C' are diagrams each illustrating a state in which the piccolo tube is fixed;

DETAILED DESCRIPTION OF THE PREFERRED EMBODIMENTS

Some embodiments of an anti-icing system according to the present invention are described below with reference to accompanying drawings.

First Embodiment

Figure 1A:
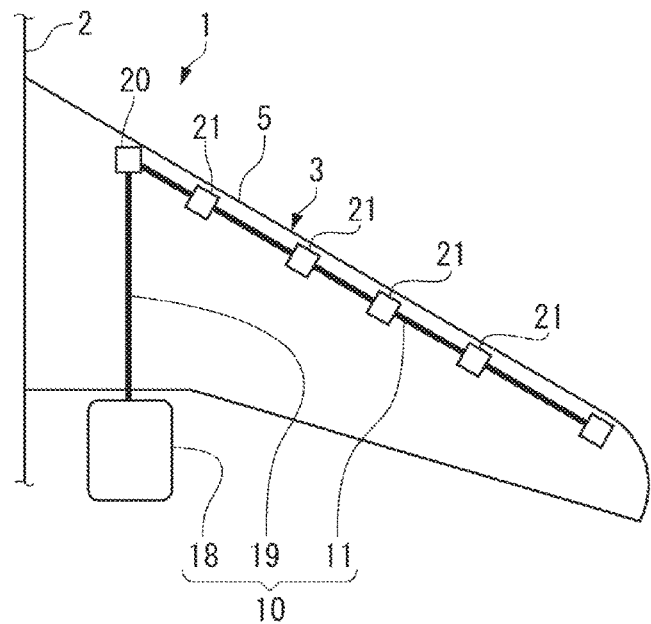
FIGS. 1A and 1B are diagrams each illustrating a schematic configuration of an anti-icing system according to a first embodiment of the present invention, where
Figure 1B:
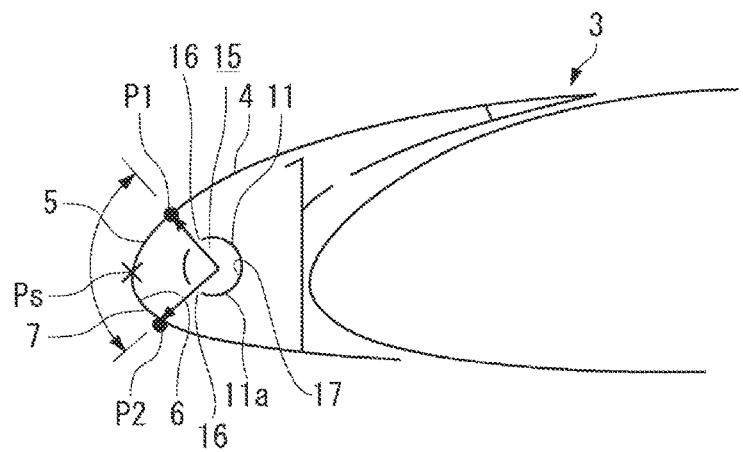

As illustrated in FIGS. 1A and 1B, an anti-icing system 10 according to the present embodiment is provided inside a slat 3 of a main wing 1 of an aircraft, and prevents icing on an outer surface 7 of a leading edge 5 of the slat 3 of the main wing 1.

The slat 3 has an outer hull configured of a wing panel 4. The wing panel 4 may be made of, for example, an aluminum alloy, or a fiver reinforced resin such as carbon fiber reinforced plastics (CFRP) and glass fiver reinforced plastics (GFRP). As illustrated in FIG. 1B, a cross-sectional surface of the leading edge 5 along a wing length direction of the wing panel 4 has a curved shape derived from bending process. The anti-icing system 10 ejects, as high-temperature high-speed jet flow, bleed air that is heated gas, toward an inner surface 6 of the leading edge 5, thereby preventing icing on the outer surface 7.

As illustrated in FIGS. 1A and 1B, the anti-icing system 10 includes, in order to eject the bleed air toward the leading edge 5: a piccolo tube 11 that includes ejection holes 16 from which the bleed air is ejected and a flow path 15 guiding the bleed air to the ejection holes 16; an engine 18 that is a supply source of the bleed air; and an air supply tube 19 that connects the piccolo tube 11 with the engine 18 and guides the bleed air to the piccolo tube 11. The engine 18 is to obtain thrust force of the aircraft, and may be, for example, a jet engine mounted to a bottom surface of the main wing 1. The bleed air handled in this system is the air extracted from a compressor of the jet engine, and has appropriate temperature because of previous cooling.

As illustrated in FIG. 1A, the piccolo tube 11 is so held at a position separated from the inner surface 6 of the leading edge 5 by a predetermined distance as to be rotatable around a central axis, along the wing length direction of the main wing 1.

In the present embodiment, the piccolo tube 11 is rotatably supported by a plurality of bearings 21 that are disposed with predetermined intervals. The bearings 21 are fixed to the slat 3 and each bearing 21 supports a load in multiple radial directions. In addition, the piccolo tube 11 is coupled, through a rotary joint 20, with the air supply tube 19 that is fixed to the main wing 1.

As illustrated in FIG. 2B, the piccolo tube 11 includes a weight 22 that is provided at a part of an inner peripheral surface 17 in a circumferential direction. The inner peripheral surface 17 surrounds the flow path 15. Further, the weight 22 is provided substantially parallel to the central axis of the piccolo tube 11, and the weight 22 forms a portion that is larger in mass than other parts, at the part of the piccolo tube 11 in the circumferential direction as illustrated in FIG. 1B. This causes the piccolo tube 11 to have an eccentric structure in which a centroid G is deviated downward from a center C in a vertical direction (see FIGS. 2C to 2E). Accordingly, the position of the weight 22 of the piccolo tube 11 is fixed even if an angle of attack of the main wing 1 is varied. This maintains the ejection holes 16 at the respective fixed positions in the gravity direction. At this time, the piccolo tube 11 rotates relative to the bearings 21, namely, relative to the main wing 1.

It is premised that the weight 22 has a mass necessary for allowing the piccolo tube 11 to be held rotatably to the bearings 21. In addition, it is necessary for the weight 22 to have a mass to such an extent that the piccolo tube 11 does not rotate when the bleed air is ejected from the ejection holes 16. Further, the position of the weight 22 in the circumferential direction is set such that the ejection holes 16 locate at desired positions when the piccolo tube 11 is disposed in the slat 3.

As illustrated in FIG. 2A, the piccolo tube 11 includes three parts, namely, an upstream tube 12, a middle-stream tube 13, and a downstream tube 14 that are disposed in order from upstream side continuous with the rotary joint 20. Note that the upstream, the middle-stream, and the downstream are expression used for discriminating the three parts from one another, and merely express relative relation of the three parts.

As illustrated in FIGS. 2C to 2E, the upstream tube 12, the middle-stream tube 13, and the downstream tube 14 are each configured of a hollow cylindrical member having the weight 22, and are different in inner diameter and outer diameter from one another. Different inner diameters form opening areas A12, A13, and A14 that are decreased in a stepwise manner from the upstream side.

$$A12 > A13 > A14$$

The piccolo tube 11 is configured by coaxially connecting, through welding or other process, the upstream tube 12, the middle-stream tube 13, and the downstream tube 14 that are prepared as separate tubes. Even if the outer diameters of the upstream tube 12, the middle-stream tube 13, and the downstream tube 14 are different from one another, appropriate adjustment is performed by the bearings 21 that are respectively fitted to the tubes, and rotation of the piccolo tube 11 in the circumferential direction is accordingly performed smoothly. In the formed piccolo tube 11, the flow path 15 through which the bleed air flows is formed of the hollow parts of the upstream tube 12, the middle-stream tube 13, and the downstream tube 14. The flow path 15 is thinned in a stepwise manner through steps from the upstream side. When the piccolo tube 11 is disposed in the slat 3, the bleed air flows through the flow path 15 in a longitudinal direction from a rear end to a front end of the main wing 1.

A plurality of ejection holes 16 that open to face the inner surface 6 of the leading edge 5 are provided in the piccolo tube 11. The ejection holes 16 make the flow path 15 communicate with the outside of the piccolo tube 11 in order to eject the bleed air. As illustrated in FIG. 2A, the plurality of ejection holes 16 are provided side by side with predetermined intervals in the longitudinal direction of the piccolo tube 11. Although the plurality of ejection holes 16 have the same diameter in the present embodiment, the diameters of the respective ejection holes 16 may be different from one another.

As illustrated in FIGS. 2A and 2B, the plurality of ejection holes 16 are disposed in two straight lines in the longitudinal direction from the upstream tube 12 to the downstream tube 14 of the piccolo tube 11 according to the present embodiment. The number of lines formed of the plurality of ejection holes 16 may be one, or two or more as with the present embodiment. Forming two or more lines by the ejection holes 16 makes it possible to disperse and eject the bleed air toward the inner surface 6 of the leading edge 5.

In the present embodiment, the two lines formed of the plurality of ejection holes 16 are respectively referred to as a first ejection hole line L1 and a second ejection hole line L2. The second ejection hole line L2 is disposed on bottom side of the first ejection hole line L1, and a centroid is located closer to the second ejection hole line L2. The plurality of ejection holes 16 that configure the first ejection hole line L1 and the second ejection hole line L2 are alternately arranged in the longitudinal direction. Alternately arranging the ejection holes 16 in two lines in the longitudinal direction makes it possible to reduce the flow amount of the bleed air ejected from one ejection hole 16, to prevent heat transfer coefficient from becoming excessively large, and to prevent overheating of the member.

The piccolo tube 11 having such a configuration rotates relative to the bearings 21 and the ejection holes 16 are maintained at the respective fixed positions in the gravity direction by virtue of the weight 22 even if the angle of attack of the aircraft is varied. This maintains the ejection holes 16 at the positions allowing the ejection holes 16 to efficiently blow the bleed air to or near a stagnation point Ps. The description thereof is given below with reference to FIGS. 3A to 3C.

Note that, in FIGS. 3A to 3C', a solid arrow indicates the bleed air (BA) ejected from the ejection hole 16 forming the first ejection hole line L1. A dashed arrow indicates the bleed air (BA) ejected from the ejection hole 16 forming the second ejection hole line L2. The arrows similarly indicates the bleed air in FIGS. 5B, 5C, 6A, 6B, 7A, 7B, 8A and 8B.

The stagnation point Ps of the slat 3 that is generated during the flight of the aircraft is defined by the cross-sectional surface and the position of the slat 3 and the angle of attack of the aircraft. It is premised in FIG. 3A that the aircraft is flying horizontally as an example; however, the position of the stagnation point Ps is changed upward or downward as the angle of attack of the aircraft is varied or the position of the slat 3 is changed. Since the aircraft flies within a particular range of the angle of attack, the stagnation point Ps is also displaced within a particular range. More specifically, the stagnation point Ps is displaced within a range between a stagnation point P1 (see FIG. 3B) and a stagnation point P2 (see FIG. 3C). The stagnation point P1 is the uppermost position of occurrence, and the stagnation point P2 is the lowermost position of occurrence. The range between the stagnation point P1 and the stagnation point P2 is referred to as a stagnation point displacement range (see FIG. 1B).

In the anti-icing system 10 according to the present embodiment, the piccolo tube 11 is rotatably held, and the ejection holes 16 are automatically adjusted, by the weight 22, to the respective fixed positions in the gravity direction. Accordingly, as illustrated in FIG. 3B, the positions of the respective ejection holes 16 are not changed in the gravity direction until the stagnation point Ps reaches the stagnation point P1 by deployment and descent of the slat 3. If the piccolo tube 11 does not rotate, the positions of the respective ejection holes 16 in the gravity direction are also changed along with the change of the position of the slat 3, as illustrated in FIG. 3B'. Using the rotatable piccolo tube 11 allows the ejection holes 16 to blow the bleed air to or near the stagnation point Ps, as compared with an existing unrotatable piccolo tube 11. Likewise, as compared with the piccolo tube 11 in which the positions of the respective ejection holes 16 are changed in the gravity direction along with the variation of the angle of attack of the aircraft as illustrated in FIG. 3C', increasing the angle of attack of the aircraft allows the ejection holes 16 to blow the bleed air to or near the stagnation point Ps until the stagnation point Ps reaches the lower limit stagnation point P2 as illustrated in FIG. 3C.

[Effects]

Effects exerted by the present embodiment are described below.

According to the present embodiment, the piccolo tube 11 is held such that the positions of the respective ejection holes 16 are fixed in the gravity direction. Therefore, even if the flight condition is changed and the position of the stagnation point Ps is displaced within the stagnation point displacement range, the ejection holes 16 are maintained at positions allowing the ejection holes 16 to blow the bleed air at least near the stagnation point Ps. This makes it possible to efficiently exert anti-icing effect and to reduce the amount of the bleed air necessary for anti-icing.

In addition, it is sufficient for the anti-icing system 10 to have a simple mechanical structure in which the rotatable piccolo tube 11 is provided with the weight 22. Therefore, the internal structure of the anti-icing system 10 becomes simple without an electric control system, which results in reduction of its weight. Further, it is possible for the anti-icing system 10 to prevent heat loss of heating of the double wall itself adopted in Japanese Patent Laid-Open No. 2011-183922, which makes it possible to reduce the supply amount of the bleed air and to improve fuel consumption of the engine. Furthermore, unlike the National Publication of International Patent Application No. 2009-523637, it is unnecessary for the anti-icing system 10 to include a projection on an outer surface, which eliminates the increase of air resistance and the deterioration of the fuel consumption.

Moreover, since the weight 22 is disposed on the inner peripheral surface 17 of the piccolo tube 11 in the anti-icing system 10, a circular outer peripheral surface 11a of the piccolo tube 11 is maintained. This facilitates installation of the anti-icing system 10 without changing the structure around the piccolo tube 11 inside the main wing 1.

Hereinbefore, although the present invention has been described based on the preferred embodiment, the configurations described in the above-described embodiment may be selected or appropriately modified without departing from the scope of the present invention.

For example, unevenness may be preferably prevented from occurring or may be preferably reduced on the surface of the weight 22 facing the flow path 15 in each of the upstream tube 12, the middle-stream tube 13, and the downstream tube 14. This makes it possible to reduce resistance of the bleed air flowing through the flow path 15 and to smoothly eject the bleed air from the ejection holes 16.

Moreover, for example, in the above-described embodiment, the example in which the weight 22 is disposed on the inner peripheral surface 17 of the flow path 15 has been described. The present invention, however, is not limited thereto. For example, the weight 22 may be disposed on an outer peripheral surface as illustrated in FIG. 4A, or the weight 22 may be disposed on both the inner peripheral surface and the outer peripheral surface.

Figure 4A:
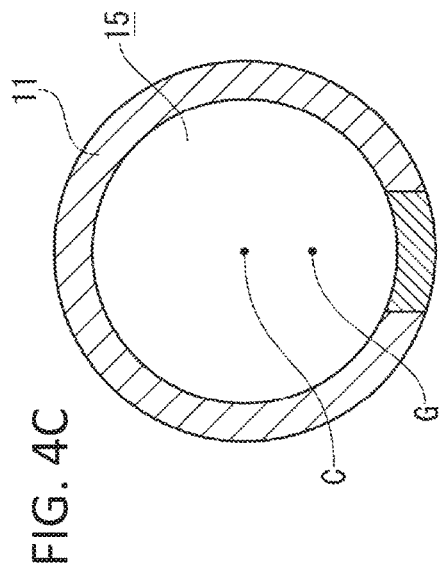
FIGS. 4A to 4D are cross-sectional diagrams each illustrating a piccolo tube according to any of other embodiments.

In particular, in an embodiment in which the weight 22 is disposed on the outer peripheral surface 11a of the piccolo tube 11 as illustrated in FIG. 4A, it is possible to more easily dispose the weight 22. In addition, it is possible to suppress influence of heat of the bleed air that directly affects the weight 22 as compared with the case in which the weight 22 is disposed on the inner peripheral surface 17. This makes it possible to select the material of the weight 22 from a wider range of materials.

Although the eccentric structure in which the centroid G is deviated downward from the center C in the vertical direction is realized by disposing the weight 22 in the hollow cylindrical piccolo tube 11 in the above-described embodiment, the present invention is not limited thereto.

Figure 4C:
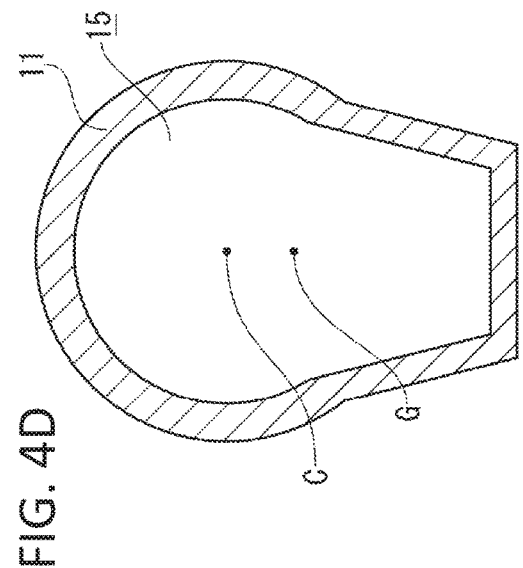
Figure 4B:
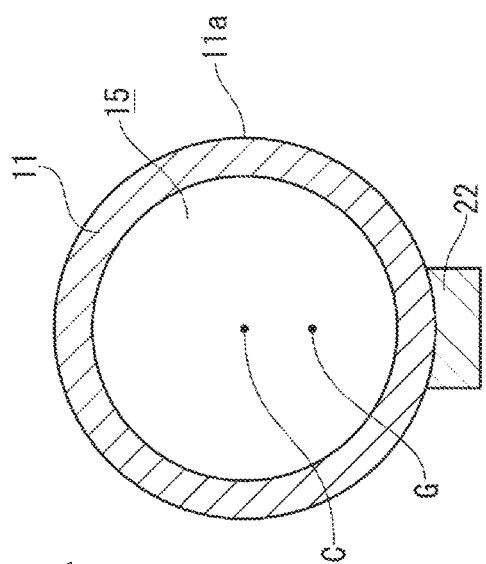

For example, as illustrated in FIG. 4B, it is possible to realize the eccentric structure by making a partial region in the circumferential direction lager in thickness than the other region in the cross-sectional surface of the piccolo tube 11. This allows for elimination of the process of disposing the weight in the piccolo tube 11 and for improvement of working efficiency. Further, as illustrated in FIG. 4C, forming a partial region in the circumferential direction of the piccolo tube 11 by a material that has density larger than that of the other region makes it possible to realize the eccentric structure. As a result, it is possible to maintain the true circular inner peripheral surface 17 and the true circular outer peripheral surface 11a of the piccolo tube 11.

Figure 4D:
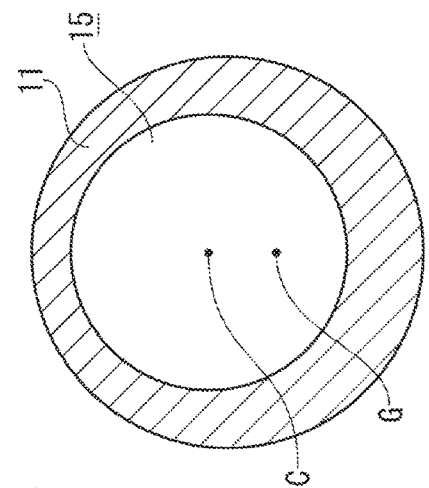

Furthermore, as illustrated in FIG. 4D, the eccentric structure may be realized by making a partial region in the circumferential direction of the piccolo tube 11 larger in size in a radial direction than the other region. This makes it possible to reduce the weight of the piccolo tube 11 as compared with the case of disposing the weight 22.

Hereinbefore, the embodiment described with reference to FIG. 1A to FIG. 4D has the axisymmetric cross-sectional surface; however, the cross-sectional surface may not be axisymmetric as long as the eccentric structure is realized.

Figure 5A:
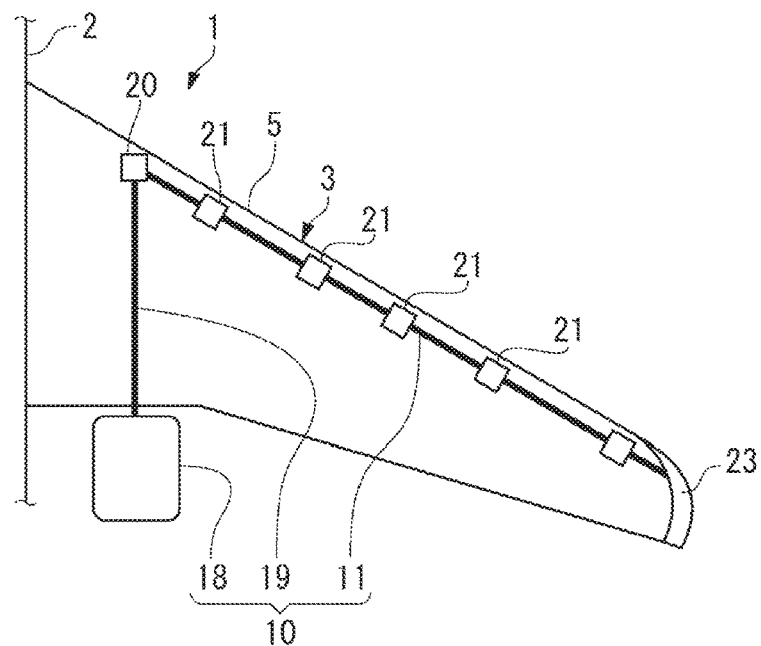
FIG. 5A is a diagram illustrating another embodiment of the present invention.
Figure 5B:
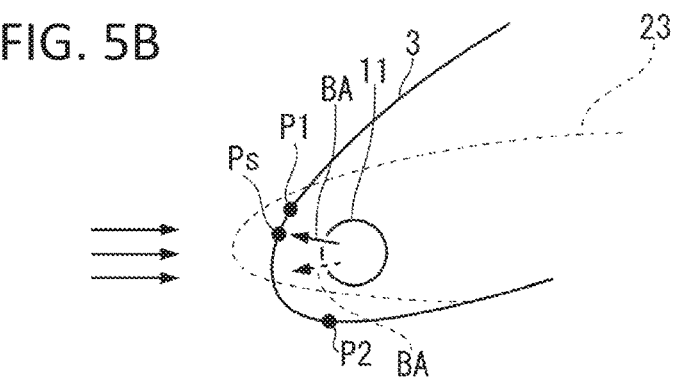
FIG. 5B is a diagram illustrating a state in which a stagnation point is displaced to an upper limit position in the present embodiment.
Figure 5C:
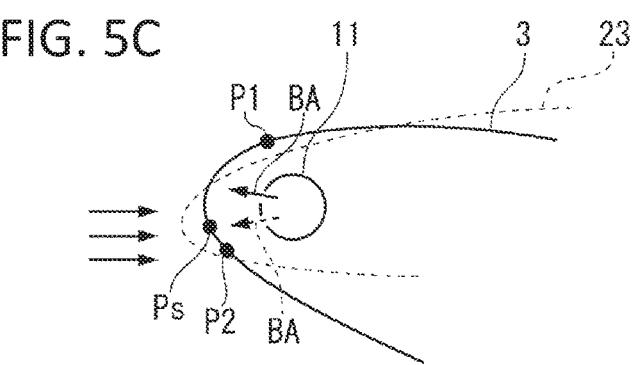
FIG. 5C is a diagram illustrating a state in which the stagnation point is displaced to a lower limit position in the present embodiment.

As illustrated in FIGS. 5A to 5C, a vane 23 may be provided on the outside of the main wing 1 instead of the eccentric structure of the piccolo tube 11. The vane 23 transfers rotary motion to the piccolo tube 11. The piccolo tube 11 and the vane 23 are coupled with each other so as not to rotate relative to each other, and the piccolo tube 11 is rotatably held by the bearings 21 as with the above-described embodiment. In addition, the angle of attack of the vane 23 is maintained at constant by the wind that is received by the aircraft during the flight as illustrated in FIG. 5B. As a result, the direction of the vane 23 and the direction of the piccolo tube 11 coupled with the vane 23 are not changed in the gravity direction even if the attitude of the aircraft is changed. Accordingly, the positions of the respective ejection holes 16 are substantially fixed in the gravity direction until the stagnation point Ps reaches the point P1. Likewise, as illustrated in FIG. 5C, the positions of the respective ejection holes 16 are substantially fixed in the gravity direction until the stagnation point Ps reaches the point P2 by the change of the attitude of the aircraft.

Second Embodiment

Next, a second embodiment of the present invention is described. Note that components of the second embodiment similar to those of the first embodiment are denoted by the reference numerals same as those in the first embodiment, and description of such components are omitted.

Figure 6A:
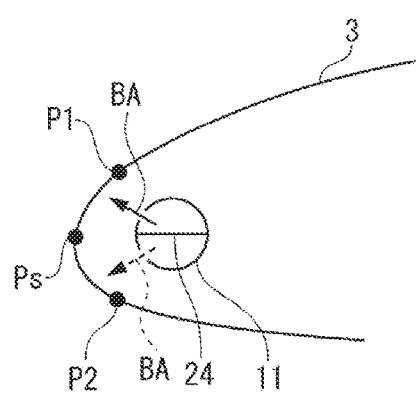
FIG. 6A is a diagram illustrating a state in which an aircraft that is mounted with an anti-icing system according to a second embodiment of the present invention is flying horizontally.
Figure 6B:
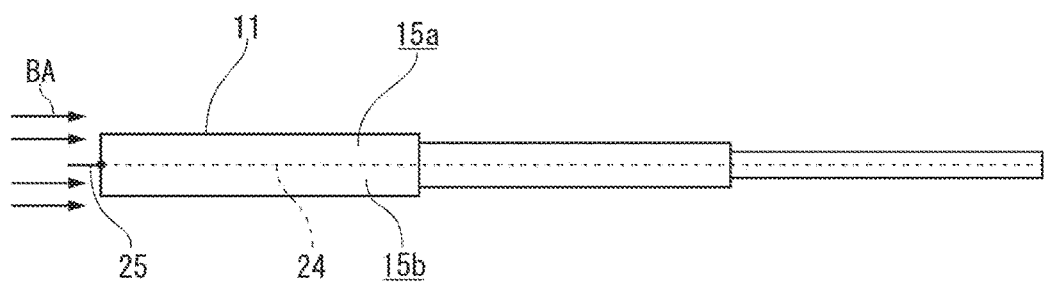
FIG. 6B is a side view illustrating a piccolo tube.

Unlike the first embodiment, the piccolo tube 11 used in the second embodiment has a centroid coincident with the center, and is unrotatably disposed inside the main wing 1. As illustrated in FIGS. 6A and 6B, a partition 24 is provided inside the piccolo tube 11 along a central axis of the piccolo tube 11 through welding or other process. The partition 24 equally partitions the flow path 15 into an upper flow path 15a corresponding to the first ejection hole line L1 and a lower flow path 15b corresponding to the second ejection hole line L2.

The piccolo tube 11 includes a first damper 25 at an end from which the bleed air flows in. The first damper 25 adjusts a flowing amount of the bleed air to each of the upper flow path 15a and the lower flow path 15b. The first damper 25 has a semicircular flat shape, and is disposed such that a chord part thereof is coincident with the partition 24 partitioning the flow path 15 into the upper flow path 15a and the lower flow path 15b. The first damper 25 is rotatably supported by the piccolo tube 11 in both the clockwise direction and the counterclockwise direction around the chord, namely, the first damper 25 is pivotable. The first damper 25 has a surface area substantially equal to an opening area of the upper flow path 15a and the lower flow path 15b that are equally partitioned. When rotating upward by 90 degrees from a neutral position, the first damper 25 reaches a position wholly closing the upper flow path 15a, whereas when rotating downward by 90 degrees from the neutral position, the first damper 25 reaches a position wholly closing the lower flow path 15b. The first damper 25 pivots between the position wholly closing the upper flow path 15a and the position wholly closing the lower flow path 15b, thereby adjusting the flow amount of the bleed air to each of the upper flow path 15a and the lower flow path 15b.

For example, when the first damper 25 is positioned at the neutral position, the equal amount of the bleed air flows into the upper flow path 15a and the lower flow path 15b (see FIG. 6B).

As mentioned above, the first damper 25 is pivotably provided in the piccolo tube 11 such that the chord part thereof is coincident with the partition 24. In addition, the first damper 25 operates to form a predetermined angle with the neutral position by an electric actuator controlled by a control mechanism, such as an electric motor. The positional angle of the first damper 25 is determined based on the position of the stagnation point Ps that is specified from information of the angle of attack and information of the slat position.

When the angle of attack of the aircraft is varied and the stagnation point Ps is accordingly displaced, the piccolo tube 11 having such a configuration adjusts the angle of the first damper 25 with respect to the neutral position to adjust the amount of the bleed air ejected from each of the first ejection hole line L1 and the second ejection hole line L2, thereby maintaining the appropriate amount of the bleed air ejected from each of the first ejection hole line L1 and the second ejection hole line L2. The adjustment is described below with reference to FIG. 7A to FIG. 8B.

Figure 7A:
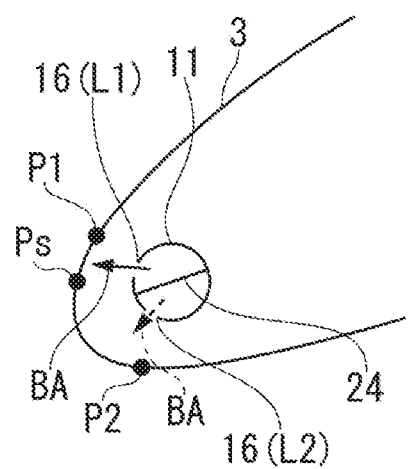
FIG. 7A is a diagram illustrating a state in which a stagnation point is displaced to an upper limit position.

As illustrated in FIG. 7A, when the stagnation point Ps is displaced to the point P1 along with deployment and descent of the slat 3, the distance between the blown point by the bleed air ejected from the first ejection hole line L1 and the stagnation point Ps is decreased, whereas the distance between the blown point by the bleed air ejected from the second ejection hole line L2 and the stagnation point Ps is increased.

Figure 8A:
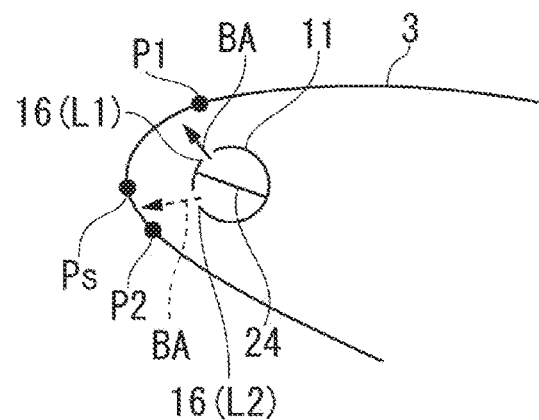
FIG. 8A is a diagram illustrating a state in which the stagnation point is displaced to a lower limit position.

In contrast, as illustrated in FIG. 8A, when the angle of attack of the aircraft is increased and the stagnation point Ps is accordingly displaced to the point P2, the distance between the blown point by the bleed air ejected from the first ejection hole line L1 and the stagnation point Ps is increased, whereas the distance between the blown point by the bleed air ejected from the second ejection hole line L2 and the stagnation point Ps is decreased.

Figure 8B:
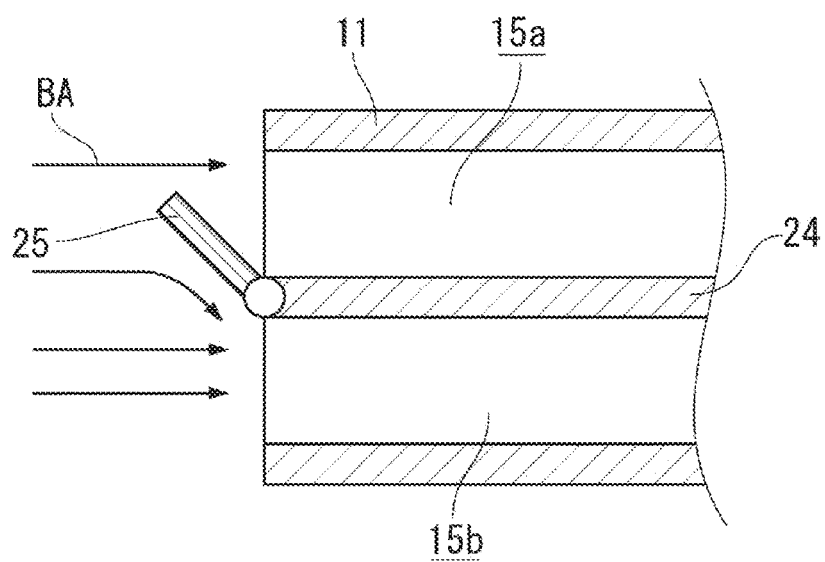
FIG. 8B is a sectional diagram illustrating a portion of the piccolo tube in an enlarged manner.

In the present embodiment, the first damper 25 is configured to rotate along with the displacement of the stagnation point Ps. Therefore, when the stagnation point Ps is displaced to the point P2, the first damper 25 rotates upward (in the clockwise direction) to reduce the flowing amount of the bleed air to the upper flow path 15a, and an ejection amount Q1 of the bleed air from the group of the ejection holes 16 that configures the first ejection hole line L1 is restricted, as illustrated in FIG. 8B. At the same time, the flowing amount of the bleed air to the lower flow path 15b is increased to increase an ejection amount Q2 of the bleed air from the group of the ejection holes 16 that configures the second ejection hole line L2. This makes it possible to efficiently eject the bleed air to the vicinity of the displaced stagnation point Ps.

Figure 7B:
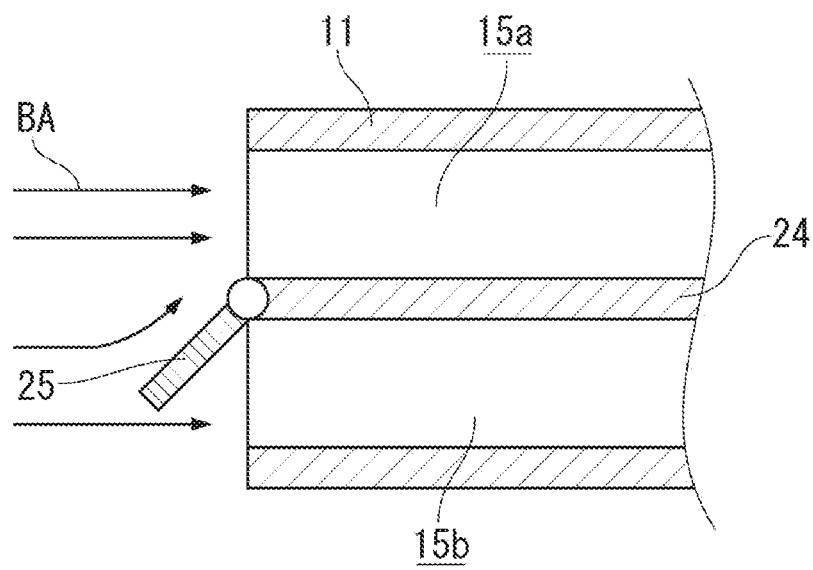
FIG. 7B is a sectional diagram illustrating a portion of a piccolo tube in an enlarged manner.

Likewise, when the stagnation point Ps is displaced to the point P1, the first damper 25 rotates downward (in the counterclockwise direction), the flowing amount of the bleed air to the lower flow path 15b is decreased and the flowing amount of the bleed air to the upper flow path 15a is increased as well. This makes it possible to efficiently eject the bleed air to the vicinity of the displaced stagnation point Ps, as illustrated in FIG. 7B.

[Effects]

As mentioned above, in the second embodiment, using the first damper 25 makes it possible to increase and decrease of one of the ejection amount Q1 and the ejection amount Q2 inversely to increase and decrease of the other ejection amount, thereby adjusting the ejection amount. This makes it possible to increase the ejection amount of the bleed air from one of the first ejection hole line L1 and the second ejection hole line L2 to efficiently exert anti-icing effect, and to decrease the ejection amount of the bleed air from the other ejection hole line to prevent overheating of the leading edge 5. Further, since the first damper 25 is provided in the piccolo tube 11, it is possible to adjust the ejection amount rapidly as compared with the case in which an airflow rate control damper is provided in the air supply tube 19 or other members.

Hereinbefore, although the present invention has been described based on the preferred embodiment, the configurations described in the above-described embodiment may be selected or appropriately modified without departing from the scope of the present invention.

Figure 9A:
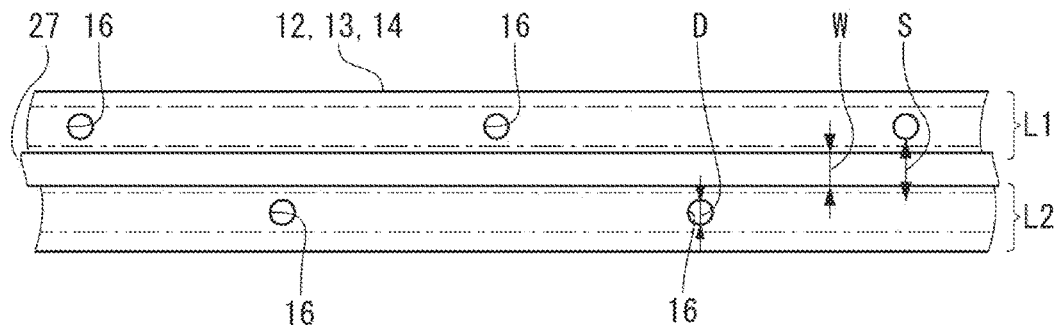
FIG. 9A is a cross-sectional diagram illustrating a piccolo tube according to still another embodiment.
Figure 9B:
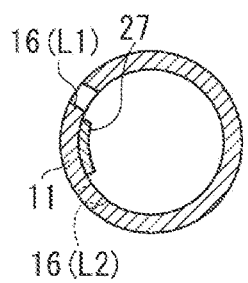
FIGS. 9B to 9D are cross-sectional diagrams.

For example, instead of the partition 24 and the first damper 25, a sliding second damper 27 having a substantially rectangular plate shape may be provided in the flow path 15 as illustrated in FIG. 9A. A long side of the second damper 27 straightly extends in the axial direction of the piccolo tube 11. The second damper 27 has a length enough to cover the part where the ejection holes 16 of the first ejection hole line L1 and the second ejection hole line L2 are provided. A surface of the second damper 27 in contact with the piccolo tube 11 is formed to have curvature substantially equal to that of the inner peripheral surface 17 of the piccolo tube 11 as illustrated in FIG. 9B. A width W of the second damper 27 is larger than an inner diameter D of each of the ejection holes 16, and is smaller than a distance S between the first ejection hole line L1 and the second ejection hole line L2.

$$S > W > D$$

The second damper 27 is provided inside the flow path 15 to be vertically movable by an electric actuator controlled by a control mechanism, such as an electric motor.

Figure 9C:
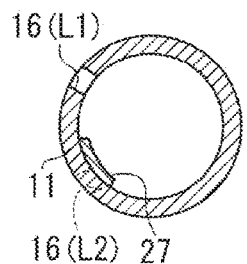
Figure 9D:
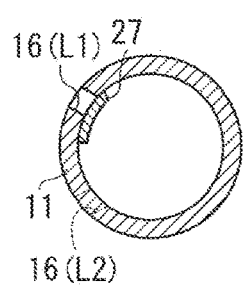
Figure 10A:
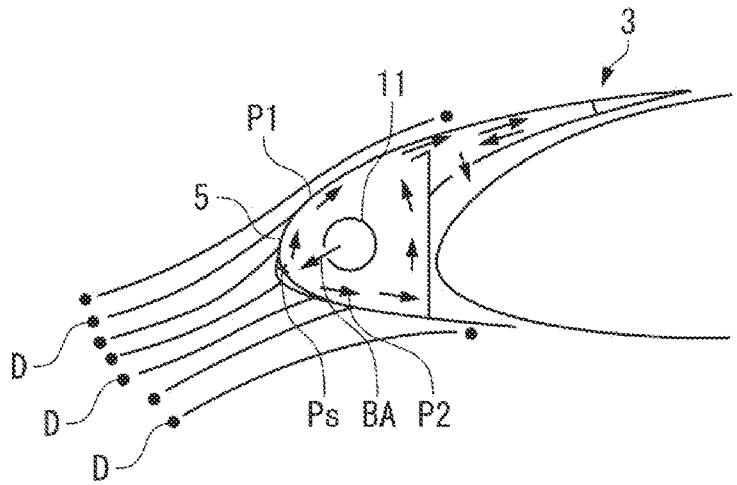
FIG. 10A is a diagram illustrating a state in which droplets collide with a main wing of an aircraft.
Figure 10B:
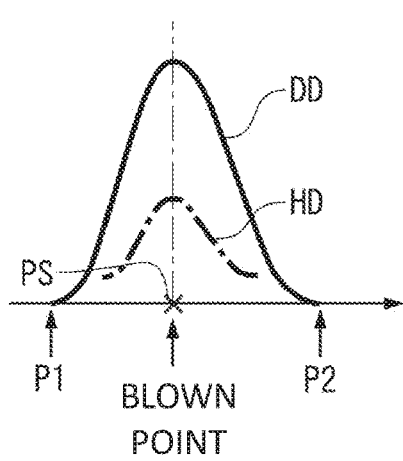
FIG. 10B is a diagram illustrating heat transfer coefficient distribution and droplet collision amount distribution in a case where a blown point of bleed air and a stagnation point are coincident with each other in a piccolo tube that includes ejection holes arranged in line.
Figure 10C:
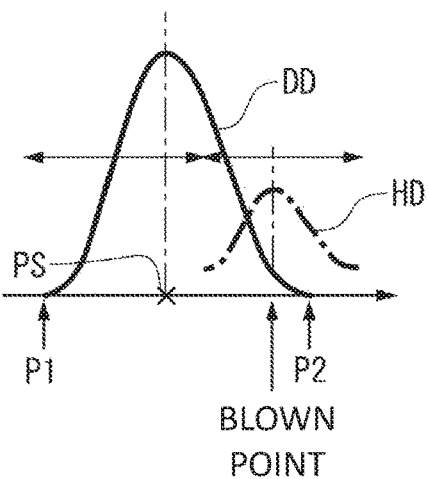
FIG. 10C is a diagram illustrating the heat transfer coefficient distribution and the droplet collision amount distribution after the stagnation point is moved from the point of FIG. 10B.

Therefore, as illustrated in FIG. 9C, when the stagnation point Ps is displaced to the point P1, the second damper 27 is moved downward to block the group of the ejection holes 16 that configures the second ejection hole line L2. This increases the ejection amount Q1 of the bleed air from the group of the ejection holes 16 that configures the first ejection hole line L1. Likewise, as illustrated in FIG. 9D, when the stagnation point Ps is displaced to the point P2, the second damper 27 is moved upward to block the group of the ejection holes 16 that configures the first ejection hole line L1. This increases the ejection amount Q2 of the bleed air from the group of the ejection holes 16 that configures the second ejection hole line L2. In the present embodiment, it is possible to adjust the ejection amount more rapidly because the ejection holes 16 are blocked. In addition, it is possible to uniform the ejection amount from the group of the unblocked ejection holes 16 that configures the first ejection hole line L1 or the second ejection hole line L2.

What is claimed is:

1. An anti-icing system that blows heated gas to an inner surface of a wing of an aircraft, the anti-icing system comprising:
    a piccolo tube that includes a flow path through which the heated gas flows in a longitudinal direction from a rear end to a front end, and a plurality of ejection holes provided along the longitudinal direction to make the flow path communicate with an outside; and
    a supply source that supplies the heated gas toward the piccolo tube, wherein
    the piccolo tube is held to cause positions of the respective ejection holes to be fixed in a gravity direction.

2. The anti-icing system according to claim 1, wherein the piccolo tube has an eccentric structure in which a centroid is deviated downward from a center in a vertical direction.

3. The anti-icing system according to claim 2, wherein the eccentric structure is configured such that a partial region in a circumferential direction on a cross-sectional surface of the piccolo tube is larger in mass than other regions.

4. The anti-icing system according to claim 3, wherein the piccolo tube includes a weight on one or both of an inner peripheral surface facing the flow path and an outer peripheral surface, to cause the partial region in the circumferential direction to be larger in mass than the other regions.

5. The anti-icing system according to claim 2, wherein the eccentric structure is configured such that a partial region in a circumferential direction on a cross-sectional surface of the piccolo tube is larger in a size in a radial direction than other regions.

6. The anti-icing system according to claim 1, wherein the plurality of ejection holes of the piccolo tube are straightly arranged in a first ejection hole line and a second ejection hole line, the first ejection hole line being disposed on a relatively upper side, and the second ejection hole line being disposed on a lower side of the first ejection hole line.

7. The anti-icing system according to claim 6, wherein the plurality of ejection holes of the first ejection hole line and the second ejection hole line are alternately arranged in the longitudinal direction on the piccolo tube.

8. The anti-icing system according to claim 2, wherein the eccentric structure is configured such that a partial region in a circumferential direction on a cross-sectional surface of the piccolo tube is larger in thickness than other regions.

9. The anti-icing system according to claim 2, wherein the eccentric structure of the piccolo tube is configured such that a partial region in a circumferential direction of the piccolo tube includes a material having density larger than that of other regions.

10. The anti-icing system according to claim 1, wherein the piccolo tube rotates relative to the main wing.

11. The anti-icing system according to claim 1, wherein the main wing is provided with a vane, and the vane is coupled with the piccolo tube so as not to rotate relative to each other.

12. An aircraft comprising the anti-icing system according to claim 1.

13. An anti-icing system that blows heated gas to an inner surface of a wing of an aircraft, the anti-icing system comprising:
    a piccolo tube that includes a flow path through which the heated gas flows in a longitudinal direction from a rear end to a front end, and a plurality of ejection holes provided along the longitudinal direction to make the flow path communicate with an outside; and
    a supply source that supplies the heated gas toward the piccolo tube, wherein
    the plurality of ejection holes of the piccolo tube are straightly arranged in a first ejection hole line and a second ejection hole line, the first ejection hole line being disposed on a relatively upper side, and the second ejection hole line being disposed on a lower side of the first ejection hole line,
    the piccolo tube includes a damper that adjusts a flow amount Q1 of the heated gas ejected from the first ejection hole line, and a flow amount Q2 of the heated gas ejected from the second ejection hole line, and
    the damper increases and decreases the flow amount Q2 inversely to increase and decrease of the flow amount Q1.

14. The anti-icing system according to claim 13, wherein the flow path of the piccolo tube is equally partitioned into an upper flow path corresponding to the first ejection hole line and a lower flow path corresponding to the second ejection hole line, and
    the damper is a first damper that adjusts an amount of the heated gas flowing into each of the upper flow path and the lower flow path.

15. The anti-icing system according to claim 14, wherein the first damper is pivotably provided in the piccolo tube.

16. The anti-icing system according to claim 15, wherein:
the piccolo tube includes a partition that equally partitions the flow path into the upper flow path and the lower flow path; and
the first damper is pivotably provided in the piccolo tube such that a part of the first damper is coincident with the partition.

17. The anti-icing system according to claim 13, wherein the damper is a second damper that is provided inside the flow path and blocks the plurality of ejection holes configuring the first ejection hole line and the plurality of ejection holes configuring the second ejection hole line.

18. The anti-icing system according to claim 17, wherein the second damper has a surface in contact with the piccolo tube, the surface having curvature substantially equal to that of an inner peripheral surface of the piccolo tube.

19. The anti-icing system according to claim 17, wherein the second damper has a width that is larger than an inner diameter of each of the plurality of ejection holes and is smaller than a distance between the first ejection hole line and the second ejection hole line.

20. An aircraft comprising the anti-icing system according to claim 13.

* * * * *